(12) United States Patent
Vija et al.

(10) Patent No.: US 7,737,406 B2
(45) Date of Patent: Jun. 15, 2010

(54) COMPENSATING FOR TRUNCATED CT IMAGES FOR USE AS ATTENUATION MAPS IN EMISSION TOMOGRAPHY

(75) Inventors: A Hans Vija, Evanston, IL (US); Trudy Dayle Rempel, West Des Monines, IA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 122 days.

(21) Appl. No.: 11/528,112

(22) Filed: Sep. 27, 2006

(65) Prior Publication Data

US 2008/0073543 A1   Mar. 27, 2008

(51) Int. Cl.
*G01T 1/166* (2006.01)
(52) U.S. Cl. .................................. 250/363.04
(58) Field of Classification Search .. 250/363.01–363.1
See application file for complete search history.

(56) References Cited

U.S. PATENT DOCUMENTS 5,338,936 A * 8/1994 Gullberg et al. ........ 250/363.04
5,752,916 A * 5/1998 Guerard et al. .............. 600/407
6,339,223 B1 * 1/2002 Motomura et al. ..... 250/363.07

OTHER PUBLICATIONS

Pan et al., "Reduction of truncation artifacts in fan beam transmission by using parallel beam emission data," 1995 IEEE, IEEE Transactions on Nuclear Science, vol. 42, No. 4. p. 1563-1567.*
McCormick et al., "The effect of truncation reduction in fan beam transmission for attenuation correction of cardiac SPECT," 1996 IEEE, IEEE Transactions on Nuclear Science, vol. 42, No. 4. p. 1252-11256.*
Maniawski et al, "Performance Evaluation of a Transmission Reconstruction Algorithm with Simultaneous Transmission-Emission SPECT system in a presence of DATA Truncation", 1995, IEEE, Nuclear Science Sympositum and Medical Imaging Conference pp. 1578-1581.*
Kaplan et al, "Generating attenuation maps using differential attenuation maps," 1997, IEEE Nuclear Science Symposium, vol. 2, pp. 1430-1433.*
Qiao et al., "Segmentation of contrast enhanced CT images for attenuation correction of PET/CT data," 2004, IEEE Nuclear Science Symposium Conference Record, vol. 5, pp. 2686-2689.*
Lee et al., "Nodule detection on chest helical CT scans by using a geneticalgorithm,", 1997, IEEE Proceedings of Intelligent Information Systems, 1997. IIS '97, pp. 67-70.*
Wang et al., "Template-matching approach to edge detection of volume data," 2001, IEEE Proceedings of International Workshop on Medical Imaging and Augmented Reality, pp. 286-291.*

* cited by examiner

*Primary Examiner*—David P Porta
*Assistant Examiner*—Kiho Kim
(74) *Attorney, Agent, or Firm*—Peter L. Kendall

(57) ABSTRACT

A process for obtaining an attenuation map from a truncated transmission scan of an imaged object, by compensating for missing emission data as a result of truncation by using non-truncated emission data of the imaged object to derive "fill-in" emission data. The truncation-compensated emission data then is used to generate an attenuation map for correcting a reconstructed emission image for effects of attenuation.

11 Claims, 2 Drawing Sheets

COMPENSATING FOR TRUNCATED CT IMAGES FOR USE AS ATTENUATION MAPS IN EMISSION TOMOGRAPHY

TECHNICAL FIELD

The present invention relates generally to medical diagnostic imaging and to correction of medical images from one imaging modality with image data from another imaging modality. More specifically the invention relates to application of an attenuation map, developed from X-ray computed tomography (CT) transmission data, for attenuation correction of radionuclide emission data from single-photon emission computed tomography (SPECT). In particular, the invention relates to the use of emission image data to compensate for missing data from transmission image data that is used for creating of attenuation correction or "mu" maps.

BACKGROUND OF THE INVENTION

In nuclear medicine imaging techniques such as single photon emission computed tomography (SPECT) and positron emission tomography (PET), medical images are regenerated based on radioactive signals, typically in the form of gamma rays, emitted from the body of a patient after the patient has been injected with a radiopharmaceutical substance. Emitted gamma rays are detected from numerous different projection angles by a gamma camera (i.e. Anger camera or scintillation camera) scanning around a longitudinal axis of the patient before conversion into electrical signals that are stored as data. Data from image projections provide a set of images as a result of a process known as image reconstruction.

Image reconstruction methods include iterative methods, such as Maximum-Likelihood-Expectation-Maximization (ML-EM) and Least Squares (LS), as well as traditional (non-iterative) reconstruction methods, such as filtered back-projection (FBP). Iterative reconstruction methods often provide better image quality and more natural ways to incorporate attenuation correction than non-iterative methods. However, iterative methods are generally more computationally intensive and more time-consuming than non-iterative methods. In fact, iterative techniques can be on the order of ten times slower than non-iterative techniques. Consequently, in the past iterative techniques were not used in clinical environment as sufficient computational power was cost prohibitive.

Over a period of approximately fifteen years a number of studies have addressed attenuation correction of images obtained using tomographic techniques. According to U.S. Pat. No. 5,376,795, photon attenuation constitutes a major deficiency in diagnosis of heart disease with SPECT and is a major source of error in the measurement of tumor metabolism using radionuclide techniques. A number of researchers have shown that use of emission-transmission imaging techniques overcomes these limitations by combining anatomical (structural) information from transmission images with physiological (functional) information from radionuclide emission images. By correlating the emission and transmission images, the observer can more easily identify and delineate the location of radionuclide uptake. In addition, improvement of the quantitative accuracy of measurement of radionuclide uptake is possible using iterative reconstruction methods, which can account for errors and improve the radionuclide images.

Other studies in this area include disclosures of U.S. Pat. No. 5,739,539, which describes a method of performing image reconstruction in a gamma camera system that includes the steps of performing a transmission scan of an object about a number of rotation angles to collect transmission projection data and performing an emission scan of the object about numerous rotation angles to collect emission projection data. The outer boundary of the object is then located based on the transmission projection data. Information identifying the boundary is then either stored in a separate body contour map or embedded in an attenuation map. Information identifying the boundary can be in the form of flags indicating whether individual pixels are inside or outside the boundary of the object. The emission projection data is then reconstructed using the attenuation map, if desired, to generate transverse slice images. Image reconstruction requires less time if the process ignores pixels outside the body boundary.

U.S. Pat. No. 6,856,666 describes multi modality imaging methods and apparatus for scanning an object in a first modality, having a first field of view to obtain first modality data including fully sampled field of view data and partially sampled field of view data. The method also includes scanning the object in a second modality having a second field of view larger than the first field of view to obtain second modality data, and reconstructing an image of the object using the second modality data and the first modality partially sampled field of view data.

The below discussed additional U.S. patents are cited as being exemplary of the prior art in the technological field of the present invention.

U.S. Pat. No. 6,830,580 entitled PET and SPECT systems with attenuation correction describes a nuclear imaging system comprising: first and second radiation detectors, each comprising an imaging surface facing each other and each having an extent; an radiation source, situated outside a space defined by a largest parallelepiped formed on two sides by said first and second detectors, which irradiates the second detector; and an axis about which the first and second detectors and the radiation source rotate together; wherein the field of view of the radiation source, defined by lines connecting the external source and the edges of the second detector, encompass the axis of rotation.

U.S. Pat. No. 6,740,883: Application of scatter and attenuation correction to emission tomography images using inferred anatomy from atlas describes a method of applying scatter and attenuation correction to emission tomography images of a region of interest of a patient under observation comprises the steps of aligning a three-dimensional computer model representing the density distribution within the region of interest with the emission tomography images. The computer model is created from image data of other subjects thereby to avoid the need to image the subject under observation to create the computer model. Scatter and attenuation correction is applied to the emission tomography images using the aligned computer model as a guide.

U.S. Pat. No. 6,642,523: PET and SPECT systems with attenuation correction describes a nuclear imaging system comprising: first and second radiation detectors, each comprising an imaging surface facing each other and each having an extent; an radiation source, situated outside a space defined by a largest parallelepiped formed on two sides by said first and second detectors, which irradiates the second detector; and an axis about which the first and second detectors and the radiation source rotate together; wherein the field of view of the radiation source, defined by lines connecting the external source and the edges of the second detector, encompass the axis of rotation.

U.S. Pat. No. 6,631,284: Combined PET and X-ray CT tomography describes a combined PET and X-Ray CT tomograph for acquiring CT and PET images sequentially in a single device, overcoming alignment problems due to internal organ movement, variations in scanner bed profile, and positioning of the patient for the scan. In order to achieve good signal-to-noise (SNR) for imaging any region of the body, an improvement to both the CT-based attenuation correction procedure and the uniformity of the noise structure in the PET emission scan is provided. The PET/CT scanner includes an X-ray CT and two arrays of PET detectors mounted on a single support within the same gantry, and rotate the support to acquire a full projection data set for both imaging modalities. The tomograph acquires functional and anatomical images which are accurately co-registered, without the use of external markers or internal landmarks.

U.S. Pat. No. 6,490,476: Combined PET and X-ray CT tomograph and method for using same describes a combined PET and X-Ray CT tomograph for acquiring CT and PET images sequentially in a single device, overcoming alignment problems due to internal organ movement, variations in scanner bed profile, and positioning of the patient for the scan. In order to achieve good signal-to-noise (SNR) for imaging any region of the body, an improvement to both the CT-based attenuation correction procedure and the uniformity of the noise structure in the PET emission scan is provided. The PET/CT scanner includes an X-ray CT and two arrays of PET detectors mounted on a single support within the same gantry, and rotate the support to acquire a full projection data set for both imaging modalities. The tomograph acquires functional and anatomical images which are accurately co-registered, without the use of external markers or internal landmarks.

U.S. Pat. No. 6,339,652: Source-assisted attenuation correction for emission computed tomography describes a method of ML-EM image reconstruction is provided for use in connection with a diagnostic imaging apparatus (10) that generates projection data. The method includes collecting projection data, including measured emission projection data and measured transmission projection data. Optionally, the measured transmission projection data is truncated. An initial emission map and attenuation map are assumed. The emission map and the attenuation map are iteratively updated. With each iteration, the emission map is recalculated by taking a previous emission map and adjusting it based upon: (i) the measured emission projection data; (ii) a reprojection of the previous emission map which is carried out with a multi-dimensional projection model; and, (iii) a reprojection of the attenuation map. As well, with each iteration, the attenuation map is recalculated by taking a previous attenuation map and adjusting it based upon: (i) the measured emission projection data; (ii) a reprojection of the previous emission map which is carried out with the multi-dimensional projection model; and (iii) measured transmission projection data.

U.S. Pat. No. 6,249,003: Imaging attenuation correction method employing multiple energy scan masks and windows describes an apparatus for generating gamma transmission and gamma emission images simultaneously includes a camera and a line transmission source of gamma radiation disposed on opposite sides of an imaging area in which a patient lies. The line detector moves along a path that substantially traverses the field of view of the gamma camera. As the gamma camera moves an acceptance region and a mask region are electronically defined and moved across the camera's field of view. Photons striking the camera are categorized according to their energy and the region of impingement. The categorization defined an emission image, a transmission image and a crosstalk image. The transmission and crosstalk images are combined to form a corrected transmission image that then is used along with the emission image to produce and image of the patient.

U.S. Pat. No. 6,140,649: Imaging attenuation correction employing simultaneous transmission/emission scanning describes a nuclear medical imaging system generates transmission and emission images simultaneously. The system includes a gamma camera and a linear transmission source disposed on opposite sides of an imaging region in which a patient lies. A plurality of views are taken at different rotational angles around a patient. At each angle, the view acquisition period is divided into two segments based on whether the transmission source is on or off. Emission image data is acquired either in both period segments or only while the transmission source is off. The transmission image data is acquired when the transmission source is on, and crosstalk image data is acquired when the transmission source is off.

U.S. Pat. No. 5,959,300: Attenuation correction in a medical imaging system using computed path lengths and attenuation values of a model attenuation medium describes a method of correcting for attenuation during emission imaging in a gamma camera medical imaging system. Attenuation values are determined empirically and are stored in a look-up table in a memory that is readable by the imaging system, with each attenuation value corresponding to a given thickness value. The attenuation values are computed before imaging is performed by first measuring the number of photons which pass from a transmission source through various known depths of water or another suitable model attenuator, using the same radiation source as will be used for emission imaging. For each depth, the measurement is then used to compute the actual attenuation for a thickness of the model attenuator. The attenuation is then stored as a value in the look-up table with corresponding values of attenuator thickness and is later used to correct emission data for the effects of attenuation.

U.S. Pat. No. 5,338,936: Simultaneous transmission and emission converging tomography describes a SPECT system includes three gamma camera heads (22a), (22b), (22c) which are mounted to a gantry (20) for rotation about a subject (12). The subject is injected with a source of emission radiation, which emission radiation is received by the camera heads. Transmission radiation from a transmission radiation source (30) is truncated to pass through a central portion of the subject but not peripheral portions and is received by one of the camera heads (22a) concurrently with the emission data. As the heads and radiation source rotate, the transmitted radiation passes through different parts or none of the peripheral portions at different angular orientations. An ultrasonic range arranger (152) measures an actual periphery of the subject. Attenuation properties of the subject are determined by reconstructing (90") the transmission data using an iterative approximation technique and the measured actual subject periphery. The actual periphery is used in the reconstruction process to reduce artifacts attributable to radiation truncation and the associated incomplete sampling of the peripheral portions. An emission reconstruction processor (112) reconstructs the emission projection data and attenuation properties into an attenuation corrected distribution of emission radiation sources in the subject.

U.S. Pat. No. 6,950,494: Method for converting CT data to linear attenuation coefficient map data describes a method for converting output data from a computer tomography (CT) device to linear attenuation coefficient data includes a step of receiving output pixel data from a CT device for a pixel of a CT image. The value of the pixel data is compared to a predetermined range. If the value is within the predetermined range, a linear attenuation coefficient is calculated from the pixel data using a first conversion function corresponding to said predetermined range. If the value is outside the predetermined range, the linear attenuation coefficient is calculated from the pixel data using a second conversion function corresponding to a range outside said predetermined range. The calculated coefficient is stored in a memory as part of a linear attenuation coefficient map.

Each improvement in attenuation correction of nuclear medicine images provides benefits associated with the quality of medical diagnoses. For this reason there is continuing need for methods of image reconstruction for reliable reproduction of a patient's physical and functional condition.

SUMMARY OF THE INVENTION

The present invention in its several disclosed embodiments provides a method for attenuation correction using transmission data to derive material properties of a portion of a patient's anatomy, also referred to herein as the imaged object. Properties of the object aid correction of radionuclide emission data obtained from the same object using a suitable image system, preferably a single photon emission computed tomography (SPECT) system. In particular, in accordance with the invention, emission data is used to compensate for transmission data that is missing from the transmission scan of the object, which is then used to construct an attenuation map for attenuation correction of the emission data.

One embodiment in accordance with the present invention uses an imaging system that requires positioning of an object to be imaged. Collection of image data then proceeds by scanning the object using a dual modality technique that provides transmission signals and emission signals for sensing by digital detectors that provide data to a computer. The computer processes the data into images for display on a monitor or a flat screen liquid crystal display (LCD).

The transmission scan includes a number of projection angles to collect transmission projection data. Similarly an emission scan traverses numerous projection angles to collect emission projection data. Reconstruction of emission projection data locates a body outline of the imaged object. Data of the body outline, applied to a transmission image derived from the transmission scan, shows portions of the imaged object missing from the transmission image data, caused by conditions such as being outside of the field of view (FOV) of the transmission scan. For example, loss of portions of the imaged object is the result of truncation when part of the patient's body extends beyond the field of view (FOV) of the transmission scan.

Devices suitable for image data collection include a computed tomography (CT) device operating in transmission mode to collect anatomical data and a nuclear medicine (NM) imaging device such as single photon emission computed tomography (SPECT) or positron emission tomography (PET) for collecting functional data. Using digital x-ray CT, a beam of x-rays impinges on a flat panel that uses an active matrix of amorphous silicon pixels to detect transmitted x-rays. The flat panel detector converts x-ray signals into electrical signals for further processing into images after signal amplification and digitization.

Detectors for nuclear medicine imaging include gamma cameras that accumulate counts of gamma photons absorbed by a crystal in the camera. The crystal structure scintillates, emitting faint flashes of light in response to incident gamma radiation. An array of photomultiplier tubes (PMT) detects the fluorescent flashes and a computer sums the fluorescent counts. The computer in turn constructs and displays a two dimensional image of the relative spatial count density on the monitor or LCD. This image then reflects the distribution and relative concentration of radioactive tracer elements present in the object, e.g. organs and tissues studied.

As described previously, images obtained from transmission and emission scans may be registered or fused to display combined images including anatomical and functional information that aids improved diagnosis. Further computer processing of the information manipulates the image data from CT and NM scans to provide refined images of emission scans that have been adjusted using attenuation correction, for example.

For attenuation correction and improved image display, a preferred embodiment of the present invention uses non-truncated emission projection data to supplement missing information anticipated to be missing from CT transmission data collected for a field of view that excludes part of the boundary of the imaged object. An estimate of the missing transmission data results from either an iterative or non-iterative process applied to the emission data. According to the present invention, attenuation correction of single photon emission computed tomographic (SPECT) images relies upon the generation of an attenuation map using the transmission-emission multi modality scan technique. As desired, the application of attenuation correction procedures occurs during a joint reconstruction of SPECT and CT data, or before the CT reconstruction, or after CT reconstruction, also referred to herein as "Post-CT reconstruction correction," which is discussed further below.

More particularly an embodiment of the present invention provides a process for performing a transmission scan of the imaged object about a plurality of projection angles to collect transmission projection data having a field of view (FOV) inside the outline of the imaged object obtained by emission projection data. The process also comprises performing an emission scan of the imaged object about a plurality of projection angles to collect emission projection data including the outline of the imaged object; After generating information locating the outline of the imaged object based on the emission projection data the process includes generation of missing transmission data within the outline of the image object from the emission data through use of a predefined model or interpolation process, converting the compensated transmission projection data to linear attenuation coefficient data for generating an attenuation map having an outer boundary. Extending the outer boundary to an extended boundary, having a size corresponding to that of the outline of the imaged object, occurs by adding transmission data values to compensate for truncation of the transmission projection data so as to provide an attenuation map that covers the entire FOV of the emission data. The process further includes using the emission projection data to provide a reconstructed image of the emission scan; and using the full attenuation map to correct the reconstructed image for attenuation.

In another embodiment according to the present invention, extending the outer boundary includes the step of modifying attenuation values between the outer boundary and the extended boundary by a predetermined quantity. Optionally, the predetermined quantity is the attenuation value associated with water.

Another embodiment according to the present invention provides a process for generating images, comprising: performing a transmission scan of an imaged object about a plurality of projection angles to collect transmission projection data and performing an emission scan of the imaged object about a plurality of projection angles to collect emission projection data. From the emission projection data, filling in missing transmission projection data from the emission FOV to provide compensated transmission projection data, generating an attenuation map from the compensated transmission projection data, and using the generated attenuation map to correct the emission data for effects of attenuation.

The beneficial effects described above apply generally to the exemplary processes disclosed herein for generating a full attenuation map including compensation for truncated CT images obtained in transmission mode. Included herein are details of non-limiting exemplary processes according to the present invention.

BRIEF DESCRIPTION OF THE DRAWINGS

The invention will now be described in greater detail in the following way of example only and with reference to the attached drawings, in which.

DETAILED DESCRIPTION OF THE INVENTION

Figure 1:
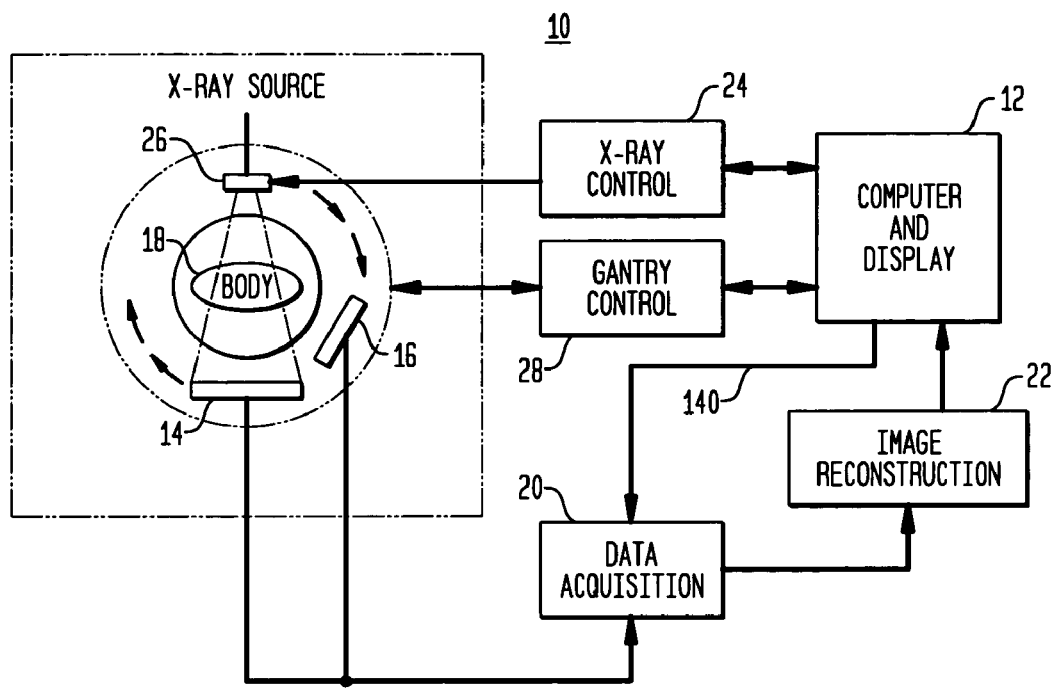
FIG. 1 is a schematic diagram of an exemplary imaging system as contemplated by the present invention.

As required, disclosures herein provide detailed embodiments of the present invention; however, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

A process according to the present invention uses an imaging system as a means to reveal the presence of tumors or other defects in the organs or tissues of a patient who exhibits symptoms of an undesirable condition. The imaging system first requires that the patient adopt a position for collection of data from the organ or area of tissue under study, also referred to herein as the imaged object. Data collection proceeds using a dual modality technique that may include either simultaneous or sequential acquisition of transmission signals and emission signals for sensing by detectors that provide data to a computer. The computer processes the data into images to be stored and/or displayed on a monitor or a flat screen liquid crystal display (LCD).

According to the present invention, attenuation correction of single photon emission computed tomographic (SPECT) images relies upon the generation of an attenuation map using a multi modality scan technique, involving x-ray computed tomography and SPECT. Truncation of the field of view (FOV) is anticipated to occur during the x-ray transmission scan.

Generally, during transmission scanning, a source of known radiation, e.g. x-ray, passes through a patient at known radiation intensity. Measurement of the intensity of radiation detected at different projection angles provides information of the extent of radiation attenuation over different spatial locations. From this information, a non-uniform attenuation map of the body and nearby structures can be generated using well known methods and procedures, including filtered backprojection (FBP) reconstruction techniques, for example. The non-uniform attenuation map, applied during the reconstruction of emission projection data, corrects emission image data for more accurate display of the imaged object obtained in emission modality.

In one embodiment according to the present invention, devices suitable for image data collection include a computed tomography (CT) device operating in transmission mode to collect anatomical data and a nuclear medicine (NM) imaging device such as single photon emission computed tomography (SPECT) or positron emission tomography (PET) for collecting functional data. For example, among the many CT devices that may be used is a digital x-ray CT device. Using such a digital x-ray CT, a beam of x-rays impinges on a flat panel that uses an active matrix of amorphous silicon pixels to detect transmitted x-rays. The flat panel detector converts x-ray signals into electrical signals that are amplified and digitized for processing into images.

Detectors for nuclear medicine imaging include gamma cameras that accumulate counts of gamma photons absorbed by a crystal in the camera. The crystal scintillates, emitting a faint flash of light in response to incident gamma radiation. Photomultiplier tubes (PMT) behind the crystal detect the flashes of light and convert the light signal into electrical pulse signals, and the computer sums the electrical pulses from the PMTs. The computer in turn constructs and displays a two dimensional image of the relative spatial count density on the monitor or LCD. This image then reflects the distribution and relative concentration of radioactive tracer elements present in the object, e.g. organs and tissues studied.

During acquisition of image data using a nuclear medicine imaging device, e.g. SPECT, signal attenuation occurs when a gamma photon interacts with tissue or other material in the path between the point of origin of the gamma emission in the imaged object and the detector. The process of attenuation occurs in a number of ways including one, referred to as the photo-electric effect, in which an emitted photon is effectively annihilated. Compton scatter is responsible for another attenuation process in which a photon emitted from the imaged object becomes deflected with loss of energy.

Attenuation and scatter both give rise to quantitative and qualitative visible errors in SPECT reconstruction. As a consequence of attenuation, image values in the various projections do not represent line integrals of the radioisotope distribution within the body. It is therefore necessary to correct for this using the process known as attenuation correction.

Many techniques for attenuation correction in SPECT assume that the linear attenuation coefficient of the body is uniform and impose such uniformity as a mathematical constraint in the image reconstruction process. However, for a very important class of studies, namely cardiac SPECT studies, the linear attenuation coefficient of the body is non-uniform because lung tissue has less effect upon attenuation than do blood and other non-lung tissue, for example. For this reason, a SPECT reconstruction of the image of radioactivity within the heart contains artifacts caused by the unequal attenuation coefficients attributable to the lungs, bones and large breast size of some female patients.

At least some multi-modality systems have different fields of views (FOVs) for the different modalities. For example, the CT/SPECT system according to the present invention has a CT FOV which is smaller than the SPECT FOV, and under some scanning conditions, portions of a patient imaged by the SPECT apparatus may extend beyond the region measured by the x-ray CT detector. Missing transmission data caused by truncation of the CT image lead to image artifacts and incomplete representations of the imaged object. Either an iterative or non-iterative process provides an estimate of the missing transmission data used in attenuation correction of the emission data. According to the present invention, attenuation correction of single photon emission computed tomographic (SPECT) images relies upon the generation of an attenuation map from data obtained via the x-ray transmission scan.

Since the imaging system according to the present invention requires patient positioning before collection of image data, there is a high probability that the patient will be in a position that remains consistent during the CT and SPECT portions of image data acquisition, greatly simplifying the process of correlating and fusing the anatomic information presented in the CT image and the functional information presented in the SPECT image. This also allows the CT image to provide attenuation correction information for the reconstruction of the SPECT image, including reconstruction of the SPECT image of the portion of the patient that extends beyond the CT FOV.

According to the present invention, locating an outline of a portion of a patient's body, i.e. the outline of the imaged object, limits reconstruction of pixels excluding points outside the body outline. This reduces the amount of time required for image reconstruction and assumes that emission radiation generated outside the body outline has no significance.

Further description of the present invention refers to the drawings in which FIG. 1 is a schematic diagram of an exemplary imaging system 10 suitable for use according to the present invention including a general purpose computer 12 to process image information supplied from a solid state x-ray detector 14 and a gamma camera scintillation detector 16 that detects radiation emitted by the imaged object 18, which is a portion of a patient's body. Signal processing hardware includes a data acquisition device 20 and an image reconstruction unit 22 for connecting the detectors 14, 16 to the computer 12, to supply transmission and emission data for reconstruction into images of the imaged object 18.

The computer 12 controls the imaging equipment, during scanning, using a control 24 for the x-ray source 26 and a gantry control 28 for movement of the detectors 14, 16 on a gantry (not shown) as they rotate about an axis corresponding to the longitudinal axis of the patient. Using data acquired from the detectors 14, 16, the computing routine provides projection data for storage, in matrix form, within the memory of the computer 12. FIG. 1 indicates image processing using an iterative technique that cycles data between the computer 12 and the data acquisition device 20, as indicated by a return path connecting the units 12, 20 together. The memory of the computer 12 also provides storage for data used for forming attenuation maps.

Figure 2:
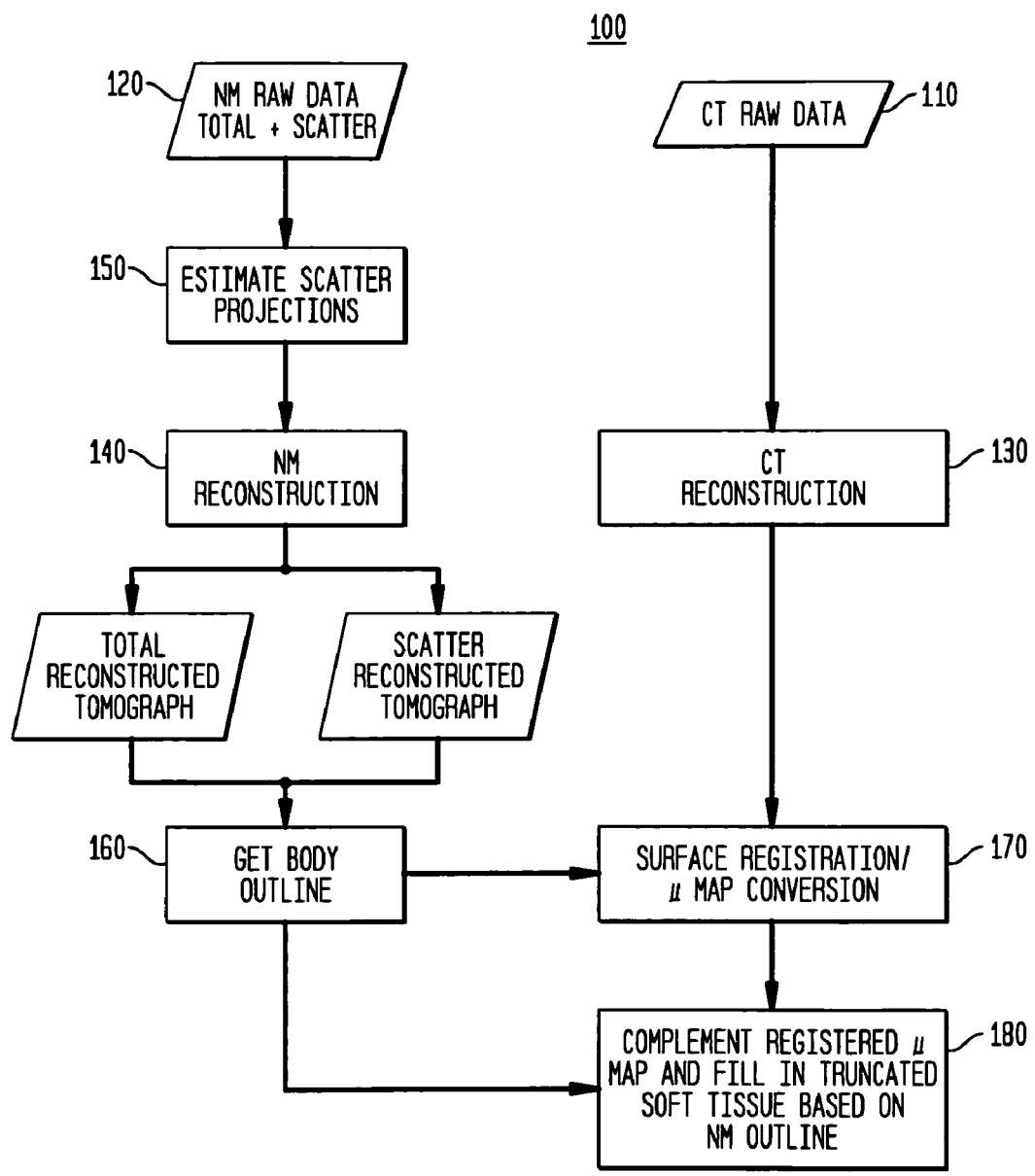
FIG. 2 is a flowchart illustrating the overall approach according to one embodiment of the present invention.

FIG. 2 provides a flow diagram 100 to illustrate the approach according to one exemplary preferred embodiment of the present invention to multimodality data reconstruction that includes attenuation correction. An embodiment of the present invention uses multimodality scans to acquire x-ray, transmission projection data 110 and nuclear medicine (NM) emission projection data 120 from single photon emission computed tomography (SPECT). Raw NM data 120 includes the total number of counts detected directly and those obtained by signal scatter, without any correction for the effects of attenuation.

Reconstruction of the x-ray transmission data 110 provides a truncated computed tomography (CT) image 130 based upon a circular CT FOV of a known but smaller size than the imaged object, i.e. the outline of the body portion. In a process referred to herein as "Post CT Reconstruction," the reconstructed non-truncated emission image volume 140 is used to derive data that is missing from the emission data as a result of truncation, such as by registration of the images using current or future registration techniques.

Reconstruction of the non-truncated emission image 140 uses data including the imaged object outline data needed to extend the boundary of the truncated CT image 130 to the size of the outline of the imaged object. Depending on the nuclear emission data and clinical application, extraction of the data for the imaged object outline relies upon a variety of methods including, using either the projection data 150 or the reconstructed emission image 140 or a combination of both. As an alternative, location of an outline 160 of an imaged object depends upon acquisition of either peak emission data or scatter emission data or both. Mapping the outline 160 of the imaged object uses several approaches such as thresholding the reconstructed emission image or reconstructing the outline from a sinogram of localized edge boundaries.

Image registration of the outline 160 of the imaged object with the truncated CT image 130 reveals points where transmission data should be added to provide data missing as a result of truncation of the CT image, so that an attenuation map may be generated having a boundary that matches the size of the outline 160. Reference to "surface registration/$\mu$ map conversion" 170 identifies this point in the process.

The "Post CT Reconstruction" process does not overwrite original CT ($\mu$-map) values inside the CT FOV but derives missing data from the truncated portion of the CT image using the emission data from the SPECT image. Data points of constant magnitude, added outside the boundary of the CT image 130, extend the boundary of the CT emission data from which the $\mu$-map is constructed to the size of the outline 160 of the imaged object. The flow diagram 100 shows a step to "complement registered $\mu$-map and fill in truncated soft tissue based on NM outline" relating to generation of an adjusted $\mu$-map 180. For convenience, the added emission values have the magnitude of emission attenuation values for water. Values outside the emission outline 160 correspond to attenuation values associated with air. Smoothing of values, added to extend the CT truncated image boundary, refines the information provided by the adjusted $\mu$-map. As desired, a user may further manipulate an image obtained by "Post CT Reconstruction" processing according to the present invention.

Compensation for truncated CT images used as attenuation maps ($\mu$-maps) in emission tomography occurs by an alternative process referred to herein as "Integrated Multi-modality Reconstruction." The basic technique of this process is the iterative reconstruction of NM and CT data sets based on the information contributed by each modality including information the modalities have in common. Reconstruction of registered images uses, in this case, the outline 160 of the imaged object to define the extended boundary for software compensation that adds derived transmission values from emission data to x-ray transmission data obtained as truncated CT fan data or truncated CT sinogram data, for example. After registered image reconstruction 170, a non-iterative technique uses a predefined model or extension formula to add missing values to the truncated CT data to yield an adjusted attenuation map 180 having an extended boundary based upon the outline 160 of the imaged object. Techniques for acquiring attenuation values to be added to truncated CT data include the use of differential attenuation information (DAI) and CT template matching. DAI exists in emission scan data 120 extracted from dual or multiple energy acquisitions where multi-emission isotopes are used.

Given the truncated CT image volume 130 and the outline 160 of the imaged object, from the emission scan 120, CT template matching involves a search of registered images 170 to reveal a CT template dataset for the best matched CT template within the FOV. In this case, formation of the extended boundary around the truncated FOV occurs with addition of attenuation values derived from best matched template values. As before, attenuation values inside the original, nominal FOV remain unchanged. Template matching may use either the CT voxel dimension or the emission voxel dimension. Use of the emission voxel dimension, which is usually larger, reduces the computational burden.

Having obtained the adjusted attenuation map 180, as described for this and the previous data processing procedure, further image manipulation follows a process of iterative, for example Penalized Least Squares, compensation based upon non-truncated views of reconstructed CT images.

According to an alternate embodiment of the invention, missing transmission projection data from the truncated CT image may be derived from the emission projection data, working in the projection space, without first reconstructing the CT image and the SPECT image. In this way, the truncation-compensated CT projection data then may be reconstructed and used to generate an attenuation or μ-map.

A process for obtaining an adjusted attenuation map, from a truncated transmission scan of an imaged object, and a non-truncated emission image of the object and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed is:

1. A process for generating an adjusted attenuation map from a truncated transmission scan of an imaged object using a non-truncated emission scan of the imaged object having an outline, comprising the steps of:
    performing a transmission scan of the imaged object about a plurality of projection angles to collect transmission projection data having a field of view (FOV) inside the outline of the imaged object, resulting in truncated transmission projection data;
    performing an emission scan of the imaged object about a plurality of projection angles to collect emission projection data having a FOV including the outline of the imaged object;
    reconstructing non-truncated emission image volume data;
    generating transmission data missing from said collected transmission projection data as a result of said truncation, based on the reconstructed non-truncated emission image volume data wherein the emission scan from the reconstructed non-truncated emission image volume data includes the imaged object outline data needed to generate the data missing from the truncated transmission data;
    adding said generated transmission data to said collected transmission data to obtain truncation-compensated transmission data using differential attenuation information (DAI) and CT template matching, wherein DAI exists in the emission scan data extracted from dual or multiple energy acquisitions where multi-emission isotopes are used, and further wherein the CT template matching involves a search of registered images to reveal a CT template dataset for the best matched CT template within the FOV of the truncated transmission projection data;
    converting the truncation-compensated transmission data to linear attenuation coefficient data for generating an attenuation map; and
    registering the attenuation map with the reconstructed non-truncated emission image volume date to correct said reconstructed non-truncated emission image volume data for effects of attenuation
    wherein reconstructing non-truncated emission image volume data includes tomographic reconstruction of emission scan data to generate image volume data.

2. The process of claim 1, wherein the transmission scan is an x-ray transmission scan.

3. The process of claim 1, wherein the emission scan is obtained by single photon emission computed tomography (SPECT).

4. The process of claim 1, wherein the step of generating transmission data includes the step of modifying emission data values in a region of transmission data truncation by a predetermined quantity.

5. The process of claim 4, wherein the predetermined quantity is the attenuation value associated with water.

6. The process of claim 1, wherein registering the attenuation map with the reconstructed emission image comprises the step of using an iterative technique to provide at least one reconstructed image of the imaged object.

7. A process for generating images, comprising:
    performing a transmission scan of an imaged object about a plurality of projection angles to collect truncated transmission projection data;
    performing an emission scan of the imaged object about a plurality of projection angles to collect non-truncated emission projection data;
    reconstructing non-truncated emission image volume data;
    locating an outline of the imaged object based on the reconstructed non-truncated emission image volume data, wherein the emission scan from the reconstructed non-truncated emission image volume data includes the imaged object outline data needed to generate the data missing from the truncated transmission data;
    deriving from said reconstructed non-truncated emission image volume data transmission data missing from said transmission projection data with respect to said outline as a result of truncation, and adding said derived transmission data to said collected transmission projection data to obtain truncation-compensated transmission data using differential attenuation information (DAI) and CT template matching, wherein DAI exists in the emission scan data extracted from dual or multiple energy acquisitions where multi-emission isotopes are used, and further wherein the CT template matching involves a search of registered images to reveal a CT template dataset for the best matched CT template within the FOV of the truncated transmission projection data;
    generating an attenuation map from said truncation-compensated transmission data;
    using the emission projection data to provide a reconstructed image of the emission scan; and
    registering the attenuation map with the reconstructed non-truncated emission image volume data to correct said reconstructed non-truncated emission image volume data for effects of attenuation
    wherein reconstructing non-truncated emission image volume data includes tomographic reconstruction of emission scan data to generate image volume data.

8. The process of claim 7, wherein generating the attenuation map comprises the step of generating data representing at least one transverse slice, and wherein locating an outline comprises determining the outline of the imaged object in each transverse slice.

9. The process of claim 7, wherein reconstructing the emission projection data uses an iterative reconstruction technique to generate said at least one image.

10. The process of claim 7, wherein the step of deriving comprises modifying collected emission data values in a region of transmission data truncation by a predetermined quantity.

11. The process of claim 10, wherein the predetermined quantity is the attenuation value associated with water.

* * * * *